United States Patent [19]
Lundt

[11] 3,860,608
[45] Jan. 14, 1975

[54] 3-AMINOALKYLOXYINDOLES

[75] Inventor: Behrend Friedrich Lundt, Soborg, Denmark

[73] Assignee: Novo Terapeutisk Laboratorium A/S, Bagsvaerd, Denmark

[22] Filed: Nov. 10, 1972

[21] Appl. No.: 305,238

Related U.S. Application Data

[63] Continuation-in-part of Ser. Nos. 39,863, May 22, 1970, abandoned, and Ser. No. 287,311, Sept. 8, 1972.

[30] Foreign Application Priority Data
May 27, 1969  Great Britain .......................... 26683

[52] U.S. Cl........ 260/326.15, 260/293.61, 424/267, 424/274
[51] Int. Cl............................................. C07d 27/56
[58] Field of Search .............................. 260/326.15

[56] References Cited
UNITED STATES PATENTS
3,703,524  11/1972  Braendstroem et al........ 260/293.61

Primary Examiner—Joseph A. Narcavage
Attorney, Agent, or Firm—Synnestvedt & Lechner

[57] ABSTRACT

This invention is concerned with novel and pharmaceutically active indole derivatives having the structure:

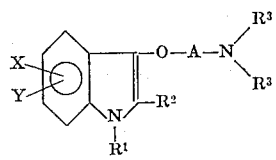

and the salts thereof with physiologically acceptable acids, in which
  each of X and Y is selected from the group consisting of hydrogen, chlorine, lower alkyl having 1 – 3 carbon atoms and lower alkoxy having 1 – 3 carbon atoms,
  $R^1$ is selected from the group consisting of hydrogen, lower alkyl having 1 – 4 carbon atoms and benzyl,
  $R^2$ is selected from the group consisting of hydrogen, lower alkyl having 1 – 4 carbon atoms, benzyl and phenyl,
  $R^3$ represents lower alkyl having 1 – 3 carbon atoms, or the two groups $R^3$ form together with the attached nitrogen atom a pyrrolidine or a piperidine ring, and
  A is an alkylene chain having 2 or 3 carbon atoms.

9 Claims, No Drawings

3-AMINOALKYLOXYINDOLES

This application is a continuation-in-part of copending applications Ser. No. 39,863 filed May 22, 1970 (now abandoned) and Ser. No. 287,311 filed Sept. 8, 1972.

This invention relates to novel indole derivatives and salts thereof with physiologically acceptable acids and to processes for preparing these compounds. The invention also relates to pharmaecutical preparations comprising the said indole derivatives or their salts with physiologically acceptable acids as the active ingredients.

The present invention provides novel indole derivatives which have the general formula:

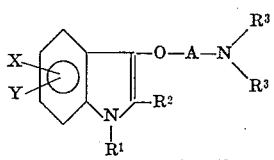

I in which
  each of X and Y is selected from the group consisting of hydrogen; chlorine; lower alkyl having 1 – 3 carbon atoms and lower alkoxy having 1 – 3 carbon atoms,
  $R^1$ is selected from the group consisting of hydrogen; lower alkyl having 1 – 4 carbon atoms and benzyl,
  $R^2$ is selected from the group consisting of hydrogen; lower alkyl having 1 – 4 carbon atoms; benzyl and phenyl,
  $R^3$ represents lower alkyl having 1 – 3 carbon atoms; or the two groups $R^3$ form together with the attached nitrogen atom a pyrrolidine or a piperidine ring, and
  A is an alkylene chain having 2 – 3 carbon atoms, and salts of the compounds of the general formula I with physiologically acceptable acids.

Examples of acids which are able to form physiologically tolerable salts with indole derivatives of the above formula are inorganic acids such as hydrochloric acid, sulfuric acid and phosphoric acid, as well as organic acids such as acetic acid, tartaric acid, citric acid, oxalic acid, furmaric acid and maleic acid.

The novel indole derivatives of the above formula I and the acid additional salts may according to the invention be prepared in one of the following manners:

1. Compounds of the general formula I in which X, Y $R^2$, $R^3$ and A are as defined in connection with formula I and $R^1$ represents hydrogen, and acid addition salts thereof, may be prepared by first reacting an indole derivative of the general formula:

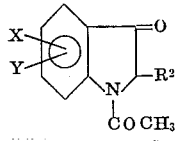

II in which X, Y and $R^2$ are as defined in connection with formula I, with a compound of the general formula:

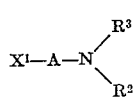

III in which $X^1$ is a halogen atom or a group functionally equivalent therewith and $R^3$ and A are as defined in connection with formula I, or with an acid addition salt thereof, thus producing a compound of the general formula:

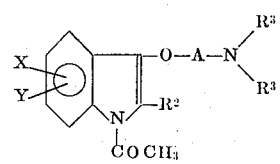

IV in which X, Y, $R^2$, $R^3$ and A are as defined in connection with formula I.

The reaction is performed in a suitable solvent, such as ethyl acetate, acetone, dimethylformamide, dimethylsulphoxide, water or mixtures of these solvents, in the presence of an acidbinding agent, such as potassium carbonate or sodium hydride.

The compounds of the general formula IV are then subjected to deacetylation in a suitable solvent, such as methanol or ethanol, by means of a basic agent, preferably ammonia or an alkali metal alkoxide, thus affording compounds of the general formula I, in which $R^1$ is hydrogen, and (2) Compounds of the general formula I, in which X, Y, $R^2$, $R^3$ and A are as described in connection with formula I and in which $R^1$ represents lower alkyl having 1 – 4 carbon atoms or benzyl may be prepared by reacting compounds of the general formula I described above, in which $R^1$ represents hydrogen, with an alkylating agent of the general formula:

$$X^2-R^4$$

V in which $X^2$ is a halogen atom and $R^4$ represents lower alkyl having 1 – 4 carbon atoms or benzyl. The reaction is performed in a suitable solvent, such as dimethylformamide or toluene, in the presence of an acidbinding agent, such as sodium hydride, whereafter, if desired, the indole derivatives thus obtained may be converted into the corresponding salts with physiologically acceptable acids. The acid addition salts are prepared by reacting the base form of the indole derivatives with not less than one equivalent of the appropriate acid in an organic solvent such as ethanol or isopropanol. Such salts may advantageously be used for the purpose of isolating and/or purifying the compounds of this invention and may be transformed in a manner known per se into the corresponding salts with other physiologically acceptable acids.

The novel indole derivatives of the general formula I as well as their salts with physiologically acceptable acids exhibit valuable pharmacological properties and are thus of potential utility in human therapy, particularly as anti-inflammatory agents.

Thus, formula I indole derivatives have been found to exhibit, in varying degrees, an anti-inflammatory activity when evaluated by various standard pharmacological tests involving both oral and parenteral administration to animals. For example, in one such test pedal inflammation was induced in rats by Carrageenin according to the method of C. A. Winther, et al., (Proc. Soc.

Exptl. Biol. Med., 111 (1962), p. 544), and the antiinflammatory activity was expressed in terms of percent inhibition of pedal inflammation. Anti-inflammatory values for a number of formula I indole derivatives administered orally at a dose level of 100 mg per kg are presented in the following Table I.

An overall evaluation of the data from the various standard animal tests using the novel indole derivatives reflects a wide spectrum of anti-inflammatory activity and indicates that the compounds of this invention may have valuable and advantageous therapeutic properties as compared to anti-inflammatory agents that are widely used at the present time.

However, for reasons of safety of administration, the preferred formula I indole derivatives are those which exhibit anti-inflammatory activity when administered to mammals at a dosage level below that of the $LD_{50}$-value of that particular compound. All of the indole derivatives listed in Table I exhibit very pronounced anti-inflammatory activity at dosage levels significantly below their $LD_{50}$-values.

Table I

| Compound | % inhibition 100 mg/kg/orally |
|---|---|
| 3-(2-diethylaminoethoxy)indole hydrochloride | 47 |
| 1-n-butyl-3-(2-diethylaminoethoxy)indole hydrogen oxalate | 32 |
| 1-benzyl-3-(2-diethylaminoethoxy)indole hydrochloride | 50 |
| 1-benzyl-3-(2-diethylaminoethoxy)-5-methoxy-indole hydrochloride | 58 |
| 1-benzyl-3-(3-dimethylaminopropoxy)indole hydrogen oxalate | 59 |
| 3-(2-(1-piperidyl)ethoxy)indole hydrochloride | 41 |
| 5-chloro-3-(2-diethylaminoethoxy)indole hydrogen oxalate | 70 |
| 1-benzyl-5-chloro-3-(2-diethylaminoethoxy)-indole hydrochloride | 34 |
| 5-methyl-3-(2-(1-piperidyl)ethoxy)-indole hydrochloride | 28 |
| 1-benzyl-3-(2-diethylaminoethoxy)-2-phenylindole hydrogen oxalate | 22 |
| 2-benzyl-3-(2-diethylaminoethoxy)-indole hydrochloride | 85 |

When the compounds of the present invention are employed as therapeutic agents they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes:, and then dehydrated sufficiently to be pressed into a solid form. They may be administered orally in the form of solutions which may contain coloring and flavoring agents, or they may be injected parenterally, that is intramuscularly, intravenously or subcutaneously. For parenteral administration, they may be used in the form of a sterile solution containing other solutes, for example, enough saline or glucose to make the solution isotonic.

The dosage of the present therapeutic agents will vary with the route of administration and the particular compound chosen. Furthermore, it will vary with the subject under treatment. In general, the compounds of this invention are most desirably administered at a concentration level that will generally afford effective results without causing any harmful or deleterious side effects and preferably at a dose level that is in the range of from 5 mg to about 2,000 mg per day, although, in individual cases, division as well as multiplication of doses may be necessary.

The preparation of the novel indole derivatives of the present invention is illustrated in detail in the following examples.

EXAMPLE 1

1-acetyl-3-(2-diethylaminoethoxy)indole hydrochloride 1-acetylindoxyl (17.5) and potassium carbonate (28 g) were mixed with tetrahydrofuran (100 ml) and water (1 ml). 2-diethylaminoethyl chloride (80 ml of a 1.24 molar soln. in toluene) was added and the mixture was refluxed for 3 hours. Another portion of 2-diethylaminoethyl chloride (80 ml of the above solution) was added followed by reflux for further 3 hours. The reaction mixture was filtered and the filtrate concentrated in vacuum. The residue, dissolved in diethyl ether (150 ml), was extracted with acetic acid (2 × 100 ml of a 2N aqueous solution). The acetic acid extract was basified with sodium hydroxide solution (6N) at 0°–10°C and the resulting mixture extracted with ether (2 × 100 ml). The ether extract was dried and concentrated by evaporation, leaving a residue which was dissolved in isopropanol (50 ml). Addition of a solution of hydrogen chloride in isopropanol afforded 1-acetyl-3-(2-diethylaminoethoxy)indole hydrochloride (23.5 g) with a melting point of 158°–160°C. Recrystallization from isopropanol gave 22 g (71% yield) of the pure compound with a melting point of 165°–166°C.

Analysis calculated for $C_{16}H_{23}O_2N_2Cl$:
C: 61.8%; H: 7.5%; O: 10.3%:, N: 9.0%; Cl: 11.4%
Found: C: 61.5%; H: 7.5%; O: 10.3%; N: 8.8%; Cl: 11.6%

EXAMPLE 2

1-acetyl-5-methoxy-3-(2-(1-piperidyl)ethoxy)indole hydrochloride

To a mixture of 1-acetyl-5-methoxyindoxyl (21 g) and potassium carbonate (27.6 g) in tetrahydrofuran (100 ml) was added 2-(1-piperidyl)ethyl chloride (53 ml of a 1.24 molar soln. in toluene) and the reaction mixture was refluxed for 3 hours. Another portion of 2-(1-piperidyl)ethyl chloride (53 ml of the above solution) was added followed by reflux for further 3 hours. The reaction mixture was worked up as described in Example 1, thus affording 1-acetyl-5-methoxy-3-(2-(1-piperidyl)ethoxy) indole hydrochloride (26.5 g, 75% yield) with a melting point of 218°–220°C.

Analysis calcultated for $C_{18}H_{25}O_3N_2Cl$:
C: 61.3%; H: 7.1%; O: 13.6%; N: 7.9%; Cl: 10.1%
Found: C: 61.3%; H: 7.1%; O: 13.5%; N: 7.9%; Cl: 10.0%

The procedure described in Example 2 above was applied in the preparation of the following compounds with the general formula IV in which $R^2$ and Y represent hydrogen and A is ethylene:

| Example No.: | X | N(R³)₂ | Yield: | Melting Point: |
|---|---|---|---|---|
| 3 | None | N(CH₃)₂.HCl | 39% | 215–216°C |
| D | None | N(CH₂)₅.HCl | 47% | 202–203°C |
| 5 | 5—Cl | N(C₂H₅)₂—HCl⁽ᵃ⁾ | 73% | 191–192°C |
| 6 | 5—Cl | N(CH₂)₅.HCl | 69% | 259–260°C |
| 7 | 5—CH₃ | N(CH₃)₂.HCl | 40% | 236–237°C |
| 8 | 5—CH₃ | N(CH₂)₅.HCl | 50% | 219–220°C |
| 9 | 5—CH₃O | N(CH₃)₂.HCl | 69% | 214–215°C |
| 10 | 5—CH₃O | N(C₂H₅)₂.HCl | 25% | 133–135°C |

⁽ᵃ⁾Contains 2 moles water of hydration.

EXAMPLE 11

1-acetyl-3-(2-diethylaminoethoxy)indole hydrochloride

A mixture of 1-acetylindoxyl (3.5 g), 2-diethylaminoethyl chloride hydrochloride (6.9 g) and potassium carbonate (11 g) was refluxed for 7 hours in ethyl acetate (100 ml) to which water (1 ml) was added. The mixture was cooled and water (100 ml) was added. The organic phase was separated, washed with sodium hydroxide solution (2 × 25 ml of 1N) followed by extraction with acetic acid (2 × 50 ml of a 1N solution). An excess of sodium hydroxide solution (6N) was added to the acetic acid extract at 0° – 10°C and the mixture was extracted with ether (2 × 50 ml). The ether extract was dried and concentrated by evaporation, leaving a residue which was dissolved in isopropanol (10 ml). Addition of a solution of hydrogen chloride in isopropanol afforded 1-acetyl-3-(2-diethylaminoethoxy)indole hydrochloride (4.0 g) with a melting point of 155°–157°C. Recrystallization from isopropanol gave 3.7 g (60% yield) of the pure compound with a melting point of 165°–166°C.

EXAMPLE 12

1-acetyl-3-(3-dimethylaminopropoxy)indole hydrogen oxalate

A mixture of 1-acetylindoxyl (8.8 g), 3-dimethylaminopropyl chloride hydrochloride (15.8 g) and potassium carbonate (27 g) in dimethylsulphoxide, DMSO, (100 ml) was kept with vigorous stirring at 40°C for 24 hours. Water (500 ml) was added and the resulting suspension was extracted with chloroform (3 × 100 ml). The chloroform extract was dried and concentrated, leaving a residue which was dissolved in isopropanol (100 ml). Addition of a solution of oxalic acid (8 g) in isopropanol (100 ml) followed by chilling afforded 1-acetyl-3-(3-dimethylaminopropoxy)-indole hydrogen oxalate (9.2 g) with a melting point of 167°–168°C. Recrystallization from methanol (over-all yield: 26%) raised the melting point to 176°–177°C.

Analysis calculated for C₁₇H₂₂O₆N₂:
C: 58.3%; H: 6.3%; O: 27.4%; N: 8.0%
Found:   C: 58.3%; H: 6.6%; O: 27.8%; N: 8.0%

EXAMPLE 13

1-acetyl-3-(2-diethylaminoethoxy)-4-methoxyindole hydrochloride

A mixture of 1-acetyl-4-methoxyindoxyl (24.7 g), 2-diethylaminoethyl chloride hydrochloride (41.6 g) and potassium carbonate (66.3 g) in DMSO (300 ml) was kept with stirring at 50°C for 6 hours. The reaction mixture was poured into ice-water (1.5 l) and the ethyl acetate layer, which appeared, was isolated. The aqueous phase was extracted twice with ethyl acetate (2 × 400 ml), and the combined ethyl acetate layers were dried and concentrated in vacuum. The residue was dissolved in isopropanol and addition of hydrogen chloride in isopropanol at 0°–5°C afforded 1-acetyl-3-(2-diethylaminoethoxy)-4-methoxyindole hydrochloride (22 g, 51%) with a melting point of 146°–147°C.

By a procedure analogous to that of the previous example the following compounds were prepared:

EXAMPLE 14

1-acetyl-5-chloro-3-(2-diethylaminoethoxy)indole hydrochloride, melting point 188°–190°C, yield 49% (The reaction time was 3 hours).

EXAMPLE 15

1-acetyl-3-(2-diethylaminoethoxy)-2-phenylindole. The compound was isolated as an oil. (The reaction time was 10 hours).

EXAMPLE 16

3-(2-diethylaminoethoxy)indole hydrochloride 1-acetyl-3-(2-diethylaminoethoxy)indole hydrochloride (15.6 g) dissolved in methanol (200 ml) saturated with ammonia was heated at 60°C in an autoclave for 7 hours. The reaction mixture was cooled, freed of solvent in vacuum, and the residue was dissolved in isopropanol (50 ml). Addition of a solution of hydrogen chloride in isopropanol at 0°–5°C yielded 3-(2-diethylaminoethoxy)indole hydrochloride (12.6 g) with a melting point of 156°–157°C. The pure compound (11.2 g, 84% yield) with a melting point of 157°–158°C was obtained after recrystallization from isopropanol.

Analysis calculated for C₁₄H₂₁O N₂Cl:
C: 62.6%; H: 7.9%; N: 10.4%; Cl: 13.2%
Found:   C: 62.5%; H: 7.9%; N: 10.1%; Cl: 13.2%

Proceeding as described in Example 16 above the following compounds of the general formula I (R¹—R²=Y=H) were prepared:

| Example No.: | X | A | N(R³)₂ | Yield: | Melting Point |
|---|---|---|---|---|---|
| 17 | None | (CH₂)₂ | N(CH₃)₂.HCl | 83% | 180–181°C |
| 18 | None | (CH₂)₂ | N(CH₂)₅.HCl | 78% | 191–192°C |
| 19 | None | (CH₂)₃ | N(CH₃)₂.(COOH)₂ | 74% | 125–126°C |
| 20 | 5—Cl | (CH₂)₂ | N(CH₂)₅.HCl | 90% | 195–196°C |
| 21 | 5—Cl | (CH₂)₂ | N(C₂H₅)₂.(COOH)₂ | 60% | 124–126°C |
| 22 | 5—Ch₃ | (CH₂)₂ | N(CH₃)₂.(COOH)₂ | 10% | 139–140°C |
| 23 | 5—CH₃ | (CH₂)₂ | N(CH₂)₅.HCl | 59% | 182–183°C |
| 24 | 5—CH₃O | (CH₂)₂ | N(CH₃)₂ | 82% | 99–100°C |
| 25 | 5—CH₃O | (CH₂)₂ | N(CH₂)₅.HCl | 74% | 164–165°C |

EXAMPLE 26

5-chloro-3-(2-diethylaminoethoxy)-indole 1-acetyl-5-chloro-3-(2-diethylaminoethoxy)indole hydrochloride (34 g) was treated for 30 minutes with a refluxing solution of sodium ethoxide, prepared from sodium (9.2 g), in ethanol (500 ml of 99%). To the reaction mixture chilled to 20°C was slowly added ice-water, and 5-chloro-3-(2-diethylaminoethoxy)indole (24 g) with a melting point of 98°C was obtained. Recrystallization from isopropanol raised the melting point to 99°C (Yield: 19.6 g, 74%).

Analysis calculated for $C_{14}H_{19}ClN_2O$:
  C: 63.1%; H: 7.2%; Cl: 13.3%; N: 10.5%
Found:   C: 62.8%; H: 7.2%; Cl: 13.3%; N: 10.5%

In a manner analogous to that of Example 26 the following compounds of the general formula I, in which $R^1$ and Y are hydrogen and A is an ethylene chain, were prepared:

| Example No.: | X | $R^2$ | $N(R^3)_2$ | Yield: | Melting Point: |
|---|---|---|---|---|---|
| 27 | H | H | $N(C_2H_5)_2$ | 72% | 87–88°C |
| 28 | 5—$CH_3O$— | H | $N(C_2H_5)_2$ | 75% | 76–77°C |
| 29[a] | H | Ph | $N(C_2H_5)_2$ | | |
| 30 | 4—$CH_3O$— | H | $N(C_2H_5)_2$ | 70% | 70–71°C |

[a] the compound was isolated as an oil.

EXAMPLE 31

1-benzyl-5-chloro-3-(2-diethylaminoethoxy)indole hydrochloride

A solution of 5-chloro-3-(2-diethylaminoethoxy)indole (15 g) in dimethylformamide, DMF, (100 ml), was concentrated in vacuum. The residue, dissolved in DMF (120 ml), was added at 25°C in the course of 15 minutes to a stirred suspension of sodium hydride (2.9 g of a 50% suspension in mineral oil) in DMF (60 ml). The reaction mixture was kept with stirring at 25°C for 2 hours, and benzyl chloride (7.6 g) dissolved in DMF (20 ml) was added at 25°C in the course of 15 minutes. The reaction mixture was left at 25°C for another hour and then poured into ice-water (1.2 l). The resulting emulsion was extracted with ethyl acetate (3 × 400 ml), and the ethyl acetate extract was dried and concentrated in vacuum. The residue was dissolved in isopropanol. Addition of a solution of hydrogen chloride in isopropanol at 20°–30°C, followed by chilling to 0°–5°C afforded 1-benzyl-5-chloro-3-(2-diethylaminoethoxy)indole hydrochloride (20.5 g) with a melting point of 162°–163°C. Recrystallization from isopropanol yielded a compound (19.7 g, 91%) with a melting point of 164°C.

Analysis calculated for $C_{21}H_{26}Cl_2N_2O$:
  C: 64.1%; H: 6.7%; Cl: 18.0%; N: 7.1%
Found:   C: 64.0%; H: 6.7%; Cl: 18.1%; N: 7.1%

EXAMPLE 32

1-benzyl-3-(2-diethylaminoethoxy)-2-phenylindole hydrogen oxalate 3-(2-diethylaminoethoxy)-2-phenylindole, obtained as an oil in Example 29, was benzylated as described in the previous example. The residue obtained after concentration of the ethyl acetate extract, was dissolved in ethanol and added to a solution of oxalic acid in ethanol at 20°–30°C. After chilling to 0°–5°C 1-benzyl-3-(2-diethylaminoethoxy)-2-phenylindole hydrogen oxalate with a melting point of 125°–127°C was obtained. Recrystallization from ethanol raised the melting point to 129°–130°C. The over-all yield over three steps was 53%.

Analysis calculated for $C_{29}H_{32}N_2O_5$:
  C: 71.3%; H: 6.6%; N: 5.7%
Found:   C: 71.5%; H: 6.6%; N: 5.6%

The following compounds of the general formula I, in which $Y = R^2 = H$, were prepared by procedures analogous to those of Examples 31 and 32:

| Example No.: | X | A | $R^1$ | $N(R^3)_2$ | Yield | Melting Point: |
|---|---|---|---|---|---|---|
| 33 | H | $(CH_2)_2$ | $PhCH_2$ | $N(C_2H_5)_2HCl$ | 63% | 144–146°C |
| 34 | H | $(CH_2)_2$ | $CH_3(CH_2)_3$ | $N(C_2H_5)_2(COOH)_2$ | 35% | 110–112°C |
| 35 | 5—$CH_3O$ | $(CH_2)_2$ | $PhCH_2$ | $N(C_2H_5)_2HCl$ | 88% | 172–173°C |
| 36 | H | $(CH_2)_3$ | $PhCH_2$ | $N(CH_3)_2(COOH)_2$ | 53% | 144–145°C |
| 37 | 4—$CH_3O$ | $(CH_2)_2$ | $PhCH_2$ | $N(C_2H_5)_2HCl$ | 65% | 136–138°C |

EXAMPLE 38

2-benzyl-3-(2-diethylaminoethoxy)indole hydrochloride

A mixture of 1-acetyl-2-benzylindoxyl (13.2 g), 2-(diethylamino)-ethyl chloride hydrochloride (17.2 g) and potassium carbonate (27.6 g) was refluxed for 7 hours with vigorous stirring in ethyl acetate (200 ml) which contained water (5 ml). The reaction mixture was poured into ice-water (300 ml), and the ethyl acetate layer, which appeared, was isolated. The aqueous phase was extracted with ethyl acetate (100 ml), and the combined ethyl acetate layers were dried and concentrated in vacuum.

The residue was treated for 15 minutes with a refluxing solution of sodium methoxide (8.1 g) in ethanol (200 ml of 99%). The reaction mixture was chilled and added to ice-water (1 liter). The resulting emulsion was extracted with ethyl acetate (3 × 150 ml) and the ethyl acetate extract was dried and concentrated in vacuum. To the residue, dissolved in isopropanol (50 ml), was added hydrogen chloride in isopropanol at 0° – 5°C. 2-benzyl-3-(2-diethylaminoethoxy)indole hydrochloride (13.5 g) with a melting point of 168°–170°C, thus obtained, was recrystallized from ethanol. The recrystallized product had a melting point of 173°–174°C. The over-all yield was 62%.

Analysis calculated for $C_{21}H_{27}N_2OCl$:
  C: 70.3%; H: 7.6%; N: 7.8%; Cl: 9.9%
Found: C: 70.1%; H: 7.8%; N: 7.9%; Cl: 10.1%

EXAMPLE 39

3-(2-(1-pyrrolidinyl)ethoxy)indole hydrochloride

In a manner analogous to that described in the previous example 3-(2-(1-pyrrolidinyl)ethoxy)indole hydrochloride with a melting point of 170°–172°C was prepared in 44% yield.

We claim:

1. An indole compound having the structure:

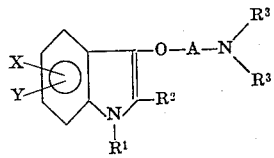

and the salts thereof with physiologically acceptable acids, in which each of X and Y is selected from the group consisting of hydrogen, chlorine, lower alkyl having 1–3 carbon atoms and lower alkoxy having 1–3 carbon atoms, $R^1$ is selected from the group consisting of hydrogen, lower alkyl having 1–4 carbon atoms and benzyl, $R^2$ is selected from the group consisting of hydrogen, lower alkyl having 1–4 carbon atoms, benzyl and phenyl, $R^3$ represents lower alkyl having 1–3 carbon atoms, or the two groups $R^3$ form together with the attached nitrogen atom a pyrrolidine of piperidine ring, and A is an alkylene chain having 2 or 3 carbon atoms.

2. The hydrochloride of a compound according to claim 1.

3. The oxalate of a compound according to claim 1.

4. The hydrochloride of a compound according to claim 2.

5. The oxalate of a compound according to claim 2.

6. A compound according to claim 1, namely, 5-chloro-3-(2-diethylaminoethoxy)-indole.

7. A compound according to claim 1, namely, 1-benzyl-3-(2-diethylaminoethoxy)-indole-hydrochloride.

8. A compound according to claim 1, namely, 1-benzyl-3-(2-diethylaminoethoxy)-5-methoxy-indole-hydrochloride.

9. A compound according to claim 1, namely, 2-benzyl-3-(2-diethylaminoethoxy)-indole-hydrochloride.

* * * * *

UNITED STATES PATENT OFFICE
CERTIFICATE OF CORRECTION

PATENT NO. : 3,860,608

DATED : January 14, 1975

INVENTOR(S) : Behrend Friedrich Lundt

It is certified that error appears in the above-identified patent and that said Letters Patent are hereby corrected as shown below:

Column 1, in Structure III, the lower "$R_2$" should be --$R_3$--

Column 4, line 14, "(17.5)" should be --(17.5 g)--

Column 5, line 2, in the Table, "D" should be --4--

Column 6, line 6, after "DMSO (300 ml)" there should be inserted --and ethyl acetate (300 ml)--

Column 9, line 27, "We claim" should be --I claim--

Column 10, line 14, "of" should be --or a--

Signed and Sealed this twenty-second Day of July 1975

[SEAL]

Attest:

RUTH C. MASON
Attesting Officer

C. MARSHALL DANN
Commissioner of Patents and Trademarks